United States Patent [19]

Foster et al.

[11] Patent Number: 5,332,508

[45] Date of Patent: Jul. 26, 1994

[54] REVERSIBLE PHOTODEPOSITION AND DISSOLUTION OF METAL IONS

[75] Inventors: Nancy S. Foster, Boulder; Carl A. Koval, Golden; Richard D. Noble, Boulder, all of Colo.

[73] Assignee: Regents of the University of Colorado, Boulder, Colo.

[21] Appl. No.: 123,730

[22] Filed: Sep. 20, 1993

[51] Int. Cl.$^5$ .............................................. C02F 1/32
[52] U.S. Cl. ...................... 210/711; 210/713; 210/748; 210/763; 210/912; 210/719; 210/721; 204/157.44
[58] Field of Search ............. 210/748, 763, 912, 710, 210/713, 711, 712, 719, 721; 204/157.44, 903, DIG. 13; 75/710, 711; 427/595

[56] References Cited

U.S. PATENT DOCUMENTS

| | | | |
|---|---|---|---|
| 4,264,421 | 4/1981 | Bard et al. | 427/595 |
| 4,629,709 | 12/1986 | Belloni Cofter et al. | 204/157.44 |
| 4,745,094 | 5/1988 | Belloni Cofler et al. | 204/157.44 |
| 4,861,484 | 8/1989 | Lichtin et al. | 210/763 |
| 4,863,608 | 9/1989 | Kawai et al. | 210/748 |
| 5,032,241 | 7/1991 | Robertson et al. | 210/748 |
| 5,069,885 | 12/1991 | Ritchie | 210/748 |
| 5,118,422 | 6/1992 | Cooper et al. | 210/748 |
| 5,126,111 | 6/1992 | Al-Ekabi et al. | 210/748 |
| 5,174,877 | 12/1992 | Cooper et al. | 204/193 |

FOREIGN PATENT DOCUMENTS

| | | | |
|---|---|---|---|
| 61155 | 6/1978 | Japan | 210/912 |
| 193191 | 8/1991 | Japan | 210/748 |

OTHER PUBLICATIONS

Michael R. Praire, et al., "An Investigation of $TiO_2$ Photocatalysis for the Treatment of Water Contaminated with Metals and Organic Chemicals", Environ. Sci. Technol., vol. 27, No. 9, 1993, pp. 1776-1782.

J. W. M. Jacobs, et al., "Copper Photodeposition on $TiO_2$ Studied with HREM and EXAFS", J. Electrochem. Soc., vol. 136, No. 10, Oct. 1989, pp. 2914-2923.

Primary Examiner—Neil McCarthy
Attorney, Agent, or Firm—Beaton & Swanson

[57] ABSTRACT

A cyclic photocatalytic process for treating waste water containing metal and organic contaminants. In one embodiment of the method, metal ions are photoreduced onto the photocatalyst and the metal concentrated by resolubilization in a smaller volume. In another embodiment of the method, contaminant organics are first oxidized, then metal ions removed by photoreductive deposition. The present invention allows the photocatalyst to be recycled until nearly complete removal of metal ions and organic contaminants is achieved.

11 Claims, 6 Drawing Sheets

REVERSIBLE PHOTODEPOSITION AND DISSOLUTION OF METAL IONS

This work was supported by grants from the United States Government funded through the National Renewable Energy Laboratory. The U.S. Government has certain rights in this invention.

FIELD OF THE INVENTION

This invention relates to photocatalytic processes. Specifically, the present invention includes a cyclical photocatalytic method for the treatment of waste streams to remove metal and organic contaminants. In the first stage of one embodiment of the process, metal ions are photoreduced onto the photocatalyst, and in a second stage, the metal is resolubilized to a decreased volume. The photocatalyst recovered after resolubilization of the metal ion may be reused. Contaminating organics in the waste stream may then be oxidized from the metal-free solution. In a second embodiment of the process, contaminating organics are first photooxidized, then the contaminant metal is photoreductively deposited with or without the addition of a different organic molecule. The additional organic is then photooxidized. The treatment is achieved solely with the use of light and air. The effectiveness of the treatment process depends on pH and the type of organic contaminant present. Under optimized conditions, the cyclical process described herein results in nearly complete removal of metal ions from the waste stream and its subsequent concentration in an organic-free solution.

BACKGROUND OF THE INVENTION

Metals are discharged into the air, water, and soil from natural sources such as continental dust, sea spray, biological activity, forest fires, and volcanic eruptions. In the last century, however, increased industrialization through mining, smelting, metal refining, production of metallic products and burning fossil fuels has released vast quantities of metals into the environment. These metals include mercury, cadmium, lead, zinc, silver, and tin from minerals, ores and bedrock. Because metals are non-degradable with infinite lifetimes, they become concentrated in food chains to toxic levels, placing a heavy burden on ecosystems. Besides the metal pollution toxicity problem, mineral and ore reserves are limited. Metal recovery processes allow conservation of scarce metal resources while decreasing environmental metal pollution.

Copper is used in the electrical industry, construction, industrial machinery, military supplies, and electroplating (Jolly & Edelstein (1988) in Copper (Jolly & Edelstein, eds.), U. S. Government Printing Office, Washington, D.C.). In 1987, the world production of primary (new) copper through mining was approximately 8.4 megatons (Mt)(Jolly & Edelstein (1988) supra; Crowson (1988) Minerals Handbook 1988-1989, Stockton Press, New York). The world reserve base (resources that are economically viable) is estimated to be 570 Mt, and the static reserve life of copper is 40 years. Obviously recycling of copper is important. The United States used 1.2 Mt of copper scrap in 1987, 41% of the total U.S. copper consumption. Besides conserving copper stores, recycling scrap copper only requires 3-40% of the energy required to extract pure copper from ore. Recycling scrap copper saves energy, conserves copper stores, and prevents further pollution of the environment from mining waste streams resulting from the smelting and refining processes.

Current methods for the removal and disposal of metals include diafiltration, adsorption on activated carbon, precipitation, ion exchange and encapsulation (Conner (1990) *Chemical Fixation and Solidification of Hazardous Wastes*, Van Nostrand Reinhold, New York). These methods are used as pretreatments to concentrate and fix metals before solidification. Before metals can be recycled from waste streams, the process must become economically feasible.

Since 1972, when Fujishima and Honda (Fujishima & Honda (1972) Nature 238:37) discovered that water could be decomposed into oxygen and hydrogen by illuminating titanium dioxide ($TiO_2$), semiconductor electrochemistry has been studied for a variety of processes related to solar energy utilization (Bard (1979) J. Photothem. 10:59; Pruden & Ollis (1983) J. Catal. 82:404; Schaife (1980) Solar Energy 25:41; Kamat & Dimitrijevic (1990) Solar Energy 44:83). Semiconductors have been used in the photodeposition of metals such as gold, silver, platinum, palladium, rhodium, mercury, lead, manganese, uranium, thallium and cobalt from aqueous solutions (Serpone et al. (1988) in *Photoreduction and Photodegradation of Inorganic Pollutants II. Selective Reduction and Recovery of Au, Pt, Pd, Rh, Hq, and Pb*. (Serpone, Borarello & Pelizzetti, eds.), Kluwer Academic Publishers, Dordrecht; pp. 527-565; Amadelli et al. (1991) J. Chem. Soc. Faraday Trans. 87:3267; Ollis et al. (1991) Environ. Sci. Technol. 25:1523; Herrmann et al. (1988) J. Catal. 113:72; Tanaka et al. (1986) Solar Energy 36:159). Although numerous examples of metal photodeposition on semiconductors exists, the extent of removal and potential use under various solution conditions has not been thoroughly studied.

Particulate semiconductors are often used in photoelectrochemical experiments due to their low cost and large surface areas (7-50 $m^2/g$ for $TiO_2$). Illumination of $TiO_2$ with a photon energy greater than the band gap (3.23 ev=384 nm for pure anatase) (Augustynski (1988) Structure and Bonding 69:1) excites an electron from the valence band to the conduction band, leaving a positively charged hole in the valence band. The conduction band edge (approximately −0.20 eV vs normal hydrogen electrode (NHE) at pH=0) represents the reducing power of the photogenerated electron, and the valence band edge (approximately 3.0 eV vs NBE) represents the oxidizing power of the photogenerated hole. Depending on solution conditions, the electron may reduce protons, water, dioxygen or metal ions. In a semiconductor particle, both the hole and the electron must be consumed to maintain neutrality. The hole may oxidize water to oxygen, oxidize water to hydroxyl radicals that in turn oxidize organics, or oxidize organics directly (Matthews (1988) J. Catal. 111:264). Theoretically, a solution species with a standard reduction potential positive of the conduction band edge and negative of the valence band edge can be reduced or oxidized by the electron or hole, respectively.

The photodecomposition of most metals involves the reduction of metal ions by the conduction band electrons and the oxidation of water to molecular oxygen by the valence band holes (Setpone et al. (1988) supra). Since many waste streams contain organics in addition to metals, the valence band holes could be used to oxidize organics instead. There are numerous examples of illuminated $TiO_2$ used as a photocatalyst in the decomposition of a variety of organic compounds (Ollis et al.

(1991) supra; Matthews (1988) supra; D'Olliveira et al. (1990) Environ. Sci. Technol. 24:990).

Reiche et al. (1979) J. Phys. Chem. 83:2248, studied the photoreduction of Cu(II) at TIO$_2$. They observed the full reduction of Cu(II) to copper metal in aqueous solutions containing either acetate or no organic. Bideau et al. (1990) Chem. Eng. Comm. 93:167, studied the kinetics of the oxidation of formate in the presence of Cu(II) ions. They observed the formation of a red Cu-TiO$_2$ species when solutions containing Cu(II) and formate were illuminated in the presence of TiO$_2$. Morishita (1992) Chem. Lett. 10:1979, studied the photodeposition of copper onto TiO$_2$ in aqueous solutions containing ethylenediaminetetraacetic acid (EDTA) or triethanolamine (TEA) at pH 5-13. Morishita observed that copper was reduced to either Cu (reddish black TiO$_2$) or Cu$_2$O (black yellow), depending upon the solution conditions.

Cooper et al. (1990) *Elucidation of Protocatalytic Purification Processes for the Removal of Trichloroethylene and Metal Ions from Water at Superfund Sites*, USEPA Final Report No. 68D80059, studied the effect of metals in solution on the photocatalytic decomposition of trichloroethylene (TCE) under aerobic conditions. They found that the rate of TCE oxidation was dependent upon the type of metal present, its concentration, and the concentration of the organic. For example, in aqueous solutions containing 100 ppm TCE, Cu(II) concentrations of 10 ppm inhibited TCE destruction, but at a Cu(II) concentration of 1 ppm, TCE oxidation was not inhibited; in solutions containing 10 ppm TCE, 1 ppm Cu(II) was enough to slow the oxidation rate of TCE.

Nothing in the prior art discloses or suggests the removal of metal ions from solution using the reversible photoreductive process in combination with the resolubilization of the metal and regeneration of the photocatalyst as in the present invention. Cooper et al. (U.S. Pat. No. 5,174,877) describe a process for photochemical degradation of aqueous organic impurities using a variety of metallic containing catalysts, including TiO$_2$. Cooper uses a cross flow filter for separating the fluid from the catalyst after the decomposition reaction is ended. Copper et al. (U.S. Pat. No. 5,118,422) describes an ultraviolet driven photocatalytic post-treatment technique for the purification of waste water distillates. Neither the Cooper patent discloses or suggests the cyclic process of the present invention, whereby separation of the catalyst and concentration of the metal ion is achieved by separation and oxidation. Bard et al. (U.S. Pat. No. 4,264,421) is directed towards the photodeposition of a variety of metals on TiO$_2$ powder as a means of removing dilute concentrations of such metals from aqueous effluent. In contrast to the present invention, Bard does not attempt to reoxidize the metal and recover the TiO$_2$ catalyst.

BRIEF SUMMARY OF THE INVENTION

Herein disclosed is a novel cyclical process for removal and concentration of metal species from waste water. In one embodiment of the process of the present invention, metal ions are first removed from solution by photoreductive deposition onto a photocatalyst. The catalyst and metal ion are then separated by resolubilization of the metal ion. The metal ion is concentrated by resolubilization into a reduced volume aqueous solution free of organics. The recovered photocatalyst may be repeatedly used in the described process. The photocatalyst is also able to photooxidize organics in the original waste stream.

In a second embodiment of the process of the present invention, contaminating organics are first photooxidized, the metal photoreductively deposited with or without the addition of a different organic molecule. The additional organic molecule is then photooxidized.

In a non-limiting example of the cyclical process of the present invention herein disclosed, the photodeposition of Cu(II) and the rapid reoxidation and concentration in the presence of O$_2$ is described. This demonstrates how a cyclic photoredox process can be used to treat mixed copper ion/organic waste streams, such as electroless copper plating bath solutions.

DETAILED DESCRIPTION OF THE PREFERRED EMBODIMENTS

The present invention discloses the potential utility of a novel cyclical photocatalytic process, which only uses light and air, for the treatment of waste water streams containing metal ions and various organic species.

In the preferred embodiment of the present invention, an aqueous waste stream containing Cu(II) ions and organic impurities is treated to remove both the copper and the organic material from the waste streams. In an initial stage of the process, an appropriate photocatalyst—preferably TiO$_2$—is irradiated in the presence of the waste strew. The Cu(II) ion is deposited onto the surface of the photocatalyst, presumably in the form of Cu(I). This process must be performed in the absence of oxygen. The photoreduction of the metal ion is accompanied by the oxidation of some of the organic compounds in the solution.

After the effectiveness of the photocatalyst begins to dissipate due to the presence of the deposited metal, the catalyst-metal solid may be placed into contact with a second solution of a greatly reduced volume relative to the volume of the initial waste stream. Introducing oxygen into the solution resolubilizes the copper via oxidation to form Cu(II) in solution and yields the photocatalyst in its active form.

One way to lower the costs of recycling copper is to use a preconcentration step before, for example, electrochemical reduction. A particular advantage of the use of the present invention to remove and/or concentrate metals found in waste streams is to accomplish such with lower costs and increase efficiency over current methods. In one preferred embodiment, the costs of recycling copper are lowered by use of a electrochemical reduction.

The present invention further encompasses additional factors that may be optimized by one skilled in the art, such as for example, pH and the type and concentration of organic molecule present.

In the preferred embodiment of the present invention, copper ion (Cu(II)) is the metal ion removed and concentrated from a mixed metal/organic waste solution. The invention is particularly effective when the contaminating organic compound is formate ion. In this instance, the cyclical process described herein results in nearly complete removal of the Cu(II) ion from the waste solution and subsequent concentration in an organic-free solution. Formate not oxidized during the photoreductive deposition process described herein may be subsequently oxidized photocatalytically in a separate procedure.

The present invention is not limited to a specific photocatalyst, metal ion or organic compound. In general, the present invention is applicable to any combination of metal and organic contaminant where it is possible to 1) photochemically photoreduce a metal ion in an aqueous waste stream in the presence of a photocatalyst to deposit the metal onto the surface of the photocatalyst; and 2) solubilize the deposited metal ion via oxidation with air, for example, without affecting the photocatalytic abilities of the photocatalyst.

In the preferred embodiment for removing Cu(II) ions from a waste stream, the photocatalyst is a semiconductor, and most preferably is $TiO_2$. Other photocatalysts include $WO_3$, $SrTiO_3$, $Fe_2O_3$, $SnO_2$, $ZnO$, and $CdS$. Other metals suitable for removal from waste streams according to the present method include gold, silver, platinum, rhodium, chromium, mercury, lead, manganese, thallium, cobalt, and uranium.

Figure 1:
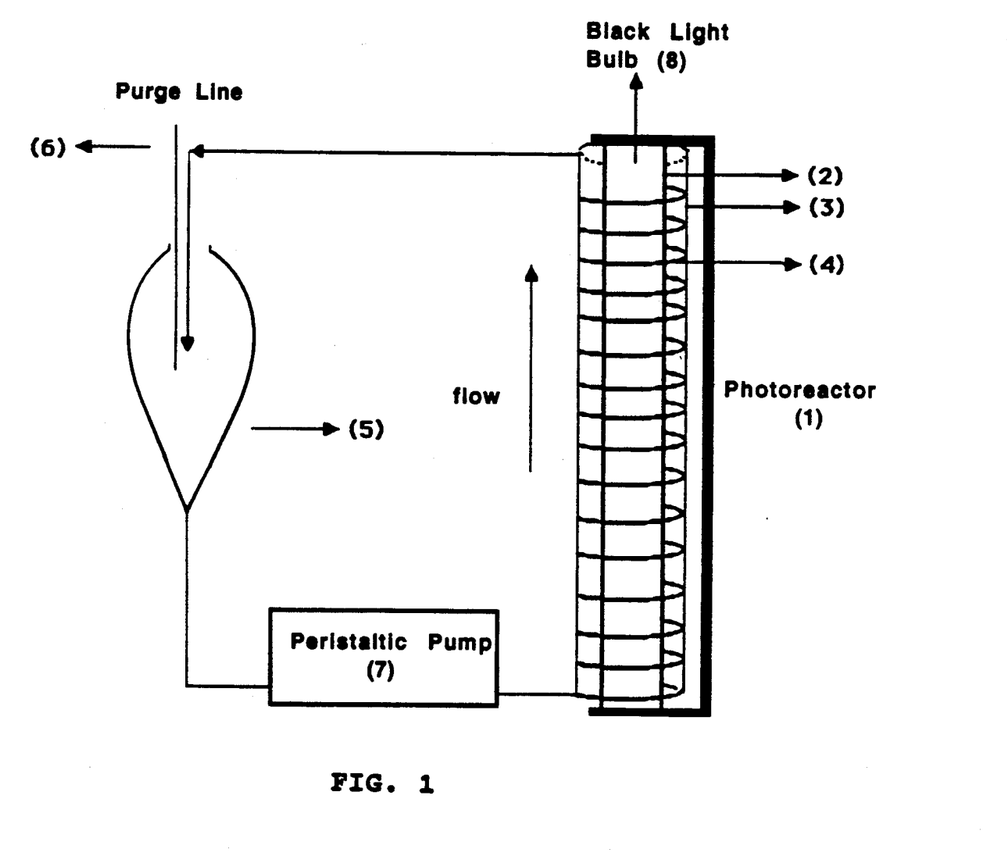
FIG. 1 is a schematic representation of photoreactor I.

The present invention includes a photoreactor design, one embodiment of which is shown in FIG. 1. The photoreactor (1) of FIG. 1 (Photoreactor II) is annular, consisting of two concentric borosilicate glass tubes 39 cm long (2 and 3) and separated by approximately 0.4 cm. A coiled glass rod inserted into the photoreactor (4) provides turbulent flow. The total volume of the reactor including the connecting pieces is 150 ml. The extra reaction solution is contained in a separatory funnel (5). A nitrogen purge line (6) is placed into the reservoir and is recirculated through the photoreactor by a Masterflex Model peristaltic pump (7). The peristaltic pump has a variable capacity up to 8 cm$^3$/sec which provided a linear velocity inside the photoreactor of up 2.5 cm/sec. A 15 W (41 cm $\times$ 2.54 cm) Sylvania black light (8) (F15T8/BLB) (mostly 366 nm) was placed in the center of the annular reactor. This photoreactor design uses a commonly manufactured black light bulb and is operates in the batch mode.

Figure 2:
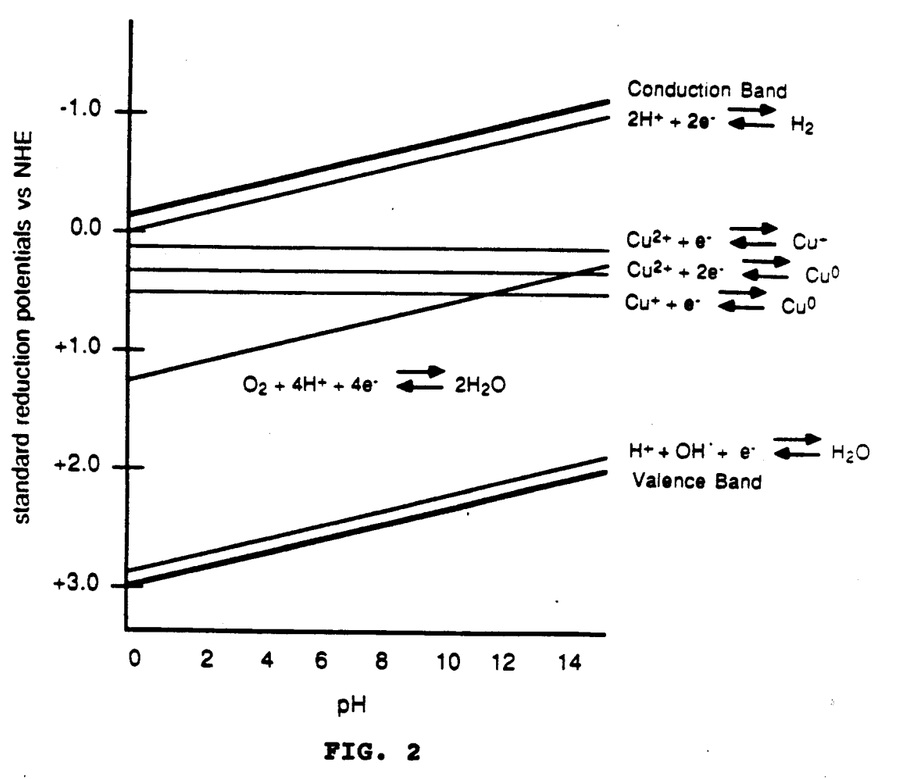
FIG. 2 shows the conduction band and valence band edges for TiO$_2$ and standard reduction potentials for water and copper species as a function of pH.

Thermodynamic considerations. FIG. 2 shows the relative standard reduction potentials of relevant solutions species (*Standard Potentials in Aqueous Solution* (Bard, Parsons & Jordan, eds.), 1988, Marcell Dekker, Inc., New York) with respect to the conduction band edge and valance band edges of $TiO_2$ as a function of pH (Ward et al. (1983) J. Am. Chem. Soc. 105:27). This figure may be used to estimate solution conditions amenable to photoreduction of copper ions. At all pHs, reduction of oxygen is highly favorable. Gerischer & Heller (1991) J. Phys. Chem. 95:5261–5267 have predicted that $O_2$ reduction will limit observed photooxidation of organics, but this conclusion has been questioned by Kormann et al. (1991) Environ. Sci. Technol. 25:494. If $O_2$ is present, it can be reduced preferentially with respect to copper ions; therefore, solutions may be purged with nitrogen or sealed to eliminate $O_2$ reduction as the conduction band process. Photoreduction of protons or water is barely favorable and was found to prevent reduction of copper ions only at pH<1.84. Reduction potentials for Cu(II,I), (I,O), and (II,0) couples are independent of pR, making photoreduction more favorable with increasing pH. The solubility of Cu(II) salts is limited in basic solutions due to the formation of the hydroxide, or to formation of carbonates, which can occur if organics are oxidized to carbon dioxide ($CO_2$).

Figure 3:
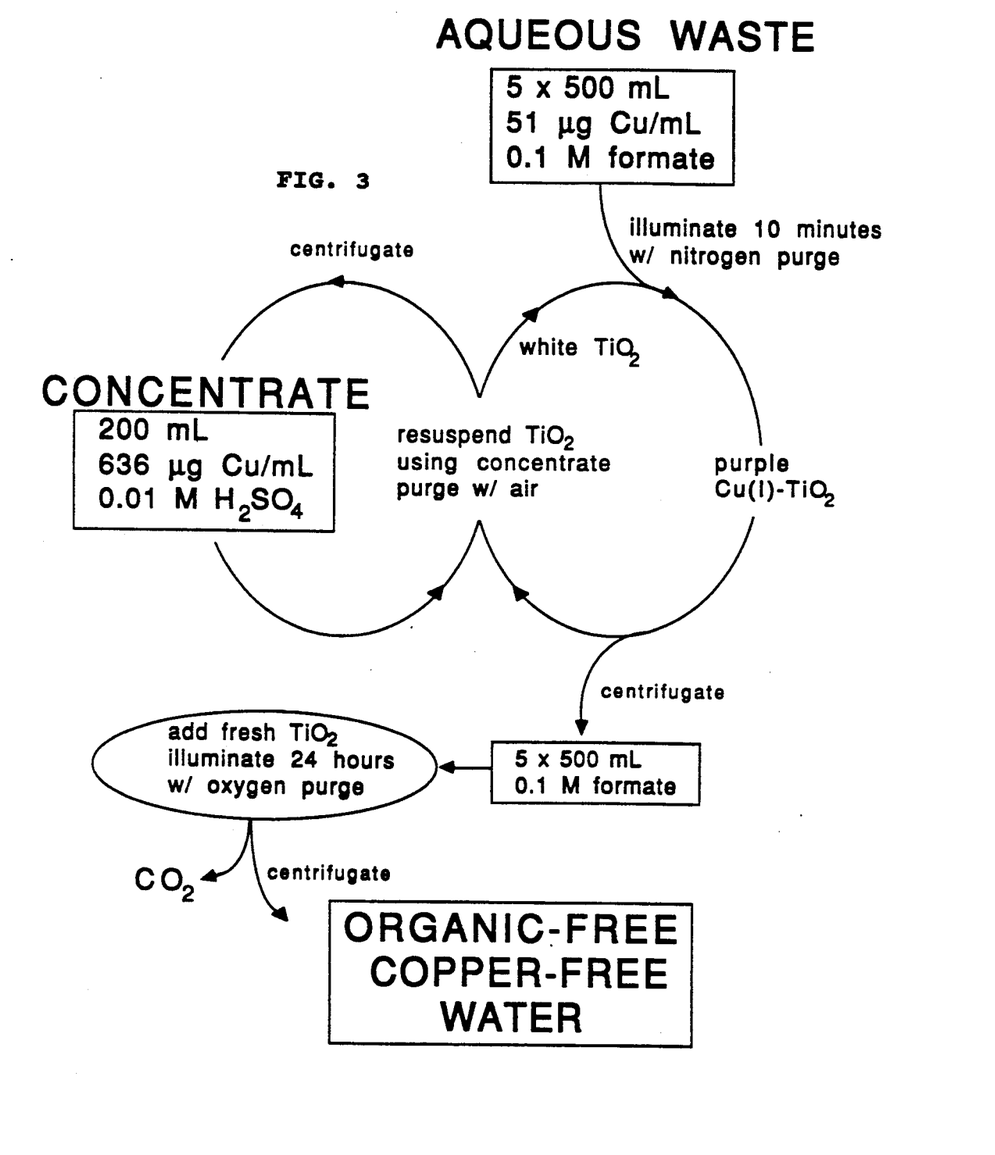
FIG. 3 depicts the photoredox treatment process of a mixed metal ion/organic waste stream. Cu(II) ions are removed from the waste stream by photoreduction onto TiO$_2$ particles. After the particles are separated, Cu(II) is concentrated by air oxidation. The remaining organic compounds may be photooxidized in the reactor under oxygen-rich conditions.

The Photoreduction Process: Percent Removal and Percent Recovery. The overall cyclical process of the present invention is shown schematically in FIG. 3. Generally, a waste solution containing metal and organic contaminants is mixed with a photoreactive material, such as a semiconductor powder, in the presence of nitrogen, and illuminated for a sufficient length of time to result in photodeposition of the reduced metal ion onto the photocatalyst. A portion of the organic present is at the same time photooxidized. The metal photocatalyst is separated from solution and the metal ion resolubilized and oxidized in the presence of oxygen ($O_2$). Resolubilization of the metal ion in a reduced volume results in concentration of the metal. The organics remaining in the metal-free solution may then be photooxidized and the separated photocatalyst re-used in subsequent cycles of the described process.

Figure 4:
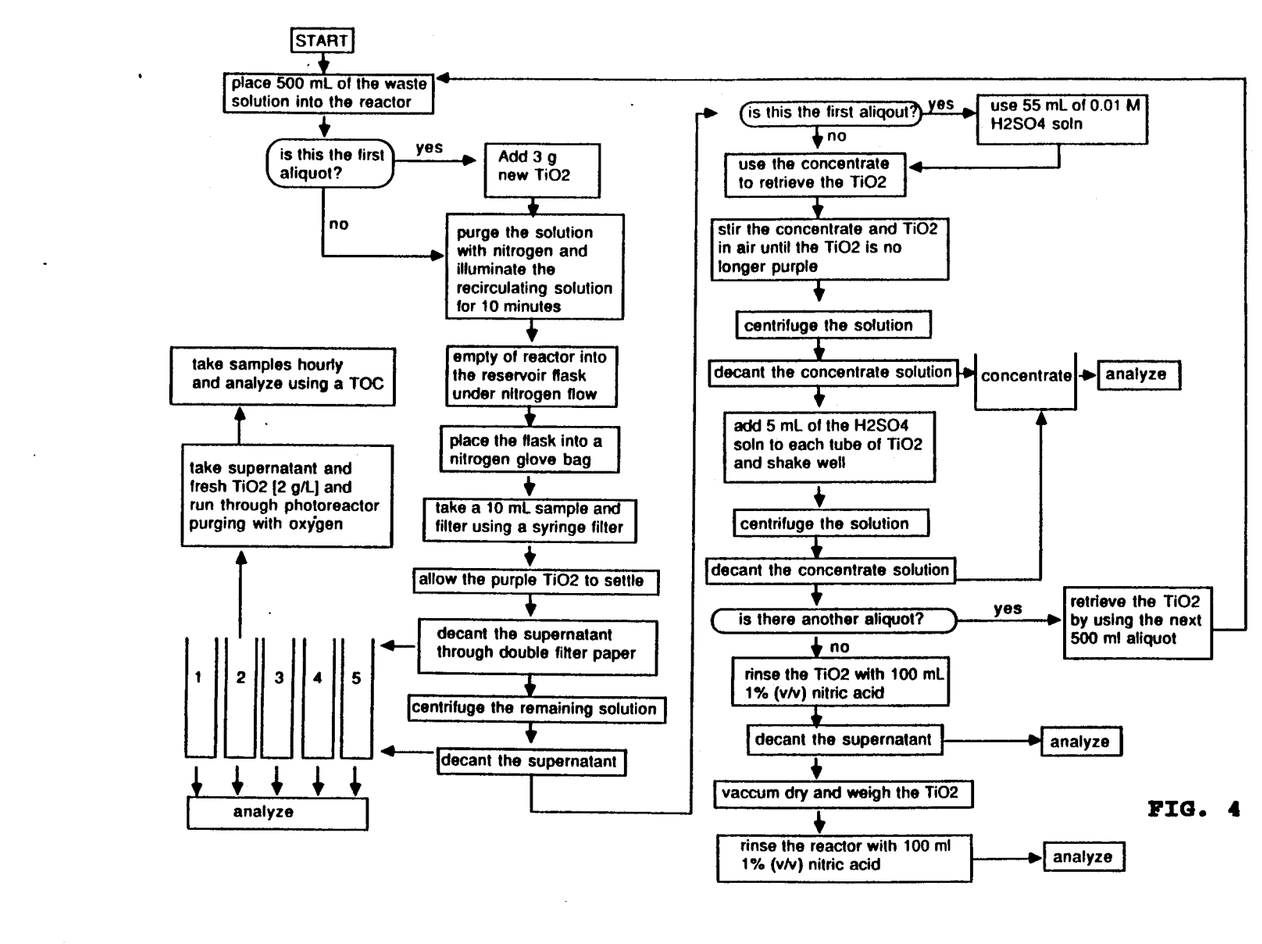
FIG. 4 is a detailed flow chart diagram of the cyclical photodeposition, separation, and oxidation method of the present invention.
Figure 5:
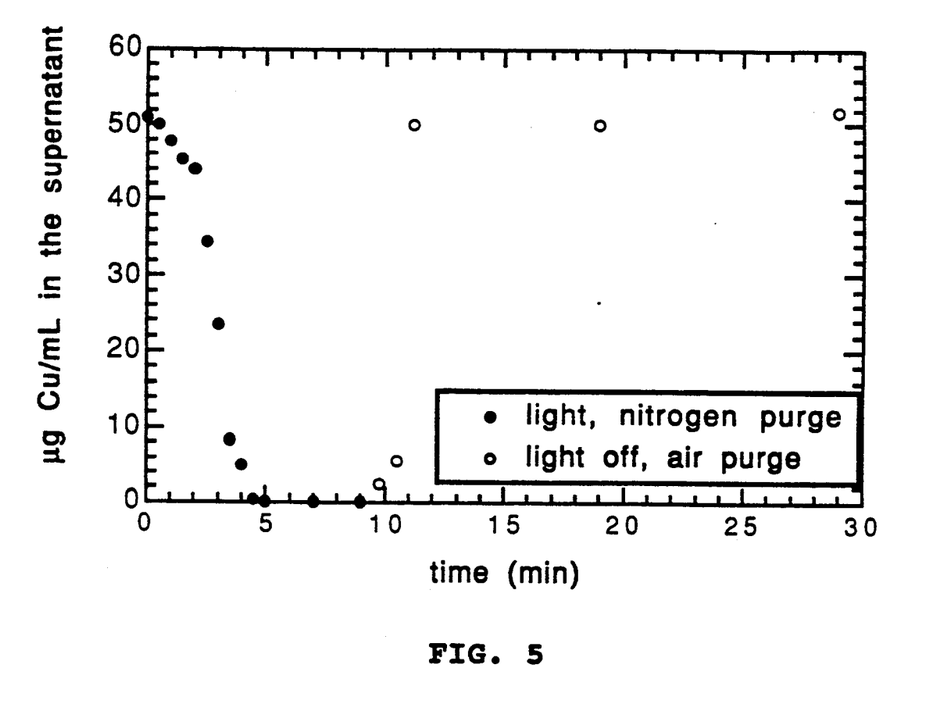
FIG. 5 shows supernatant copper concentrations as a function of time for a nitrogen-purged illuminated solution containing 51 µg Cu(II)/ml, 0.1 M sodium formate, and 2 g TiO$_2$/l at pH 3.60.

The detailed experimental protocol used in the examples below is shown in the flowchart of FIG. 4. A nitrogen-purged solution containing copper sulfate ($CuSO_4$), excess sodium formate, and $TiO_2$ that was illuminated with a black light turned from white to purple, forming a Cu-$TiO_2$ species. When the solution was exposed to air, the purple Cu-$TiO_2$ species disappeared and the $TiO_2$ returned to white. As the purple Cu-$TiO_2$ species formed, there was a corresponding decrease in the Cu(II) concentration in the supernatant. FIG. 5 shows a typical decrease in Cu(II) supernatant concentration as a function of time for 0.4 l of a solution that contained 51 $\mu$g of Cu/ml (as $CuSO_4$), 0.1 M sodium formate, and 2 g of $TiO_2$/l (pH 3.60). Formate ion was chosen as a hole scavenger in these experiments because it is the primary organic compound found in spent electroless copper plating bath solutions (formaldehyde is used as the reducing agent) and because it is cleanly photooxidized to $CO_2$. Cu(II) concentrations were driven back from 51 $\mu$g/ml to $\leq$0.018 $\mu$g/ml (95% confidence level calculated from the blank standard deviation) within 5 minutes. During the photodeposition of copper, two rates are consistently seen. The photoreduction starts slowly with a rate of 3.9 $\mu$g Cu/ml/min. The rate then increases to 18.4 $\mu$g/ml/min until the copper is driven to below detectable levels. The average rate over the first 4.5 minutes is 11.3 $\mu$g Cu/ml/min which corresponds to a quantum yield of 43% based on one Cu(II) ion removed per absorbed photon. Photoefficiency is defined as the rate of decrease in the Cu(II) concentration divided by the photon flux determined by actinometry (x100), and is based on one Cu(II) ion removed per incident photon. Backscattering of the light was not taken into account. When the light was turned off and the photoreactor was purged with air while the solution recirculated, 98% of the Cu(II) was returned to the supernatant within 130 seconds and 100% within 20 minutes.

The following equations summarize probable reactions involved in the photoreduction and oxidative recovery of Cu(II) ions:

$$2\ (TiO_2 + h\nu \longrightarrow e^- + h^+) \quad \quad 1$$

$$2\ Cu^{2+} + 2\ e^- \longrightarrow 2\ Cu^+ \quad \quad 2$$

$$HCO_2^- + 2\ h^+ \longrightarrow CO_2 + H^+ \quad \quad 3$$

net photoreaction:

$$2\ Cu^{2+} + HCO_2^- + 2\ h\nu \longrightarrow \underset{(purple)}{2\ Cu^+/TiO_2} + CO_2^- + H^+ \quad \quad 4$$

net dark oxidation:

$$4H^+ + \underset{(purple)}{4Cu^+/TiO_2} + O_2 \longrightarrow 4Cu^{2+} + \underset{(white)}{4TiO_2} + 2H_2O \quad \quad 5$$

The light excites electrons, creating electron/hole pairs ($e^-/h^+$) in equation 1. The electrons reduce Cu(II) to Cu(I) in equation 2, and the holes oxidize formate to $CO_2$ in 3. EPR experiments indicate that purple Cu-$TiO_2$ is Cu(I). Bideau et al. (1990) supra reported the red Cu$TiO_2$ is a mixture of Cu(O) and Cu(I). The oxidative dissolution of Cu(II) is shown in equation 5.

Characterization of the Purple Cu(I)-$TiO_2$ Species. XPS was used to investigate the oxidation state of the copper in the purple Cu-$TiO_2$ species formed. The Cu(II) $2p_{5/2}$ line displays satellite structure (Kaushik (1990) Phys. Chem. 168:161) not present in the photoelectron lines of Cu(O) and Cu(I) species. However, Cu(O) and Cu(I) cannot be distinguished from one another because their binding energies are too close for accurate determination from XPS spectra (Petit et al. (1979) Electrochim. Acta 24:1023). The XPS spectra of the purple Cu-$TiO_2$ species gave two binding energies peaks at 932.6 and 952.6 eV. No satellite structure was observed. From these spectra, it is clear that the copper present as the purple species was reduced from the initial Cu(II) state, but an assignment as Cu(O) or Cu(I) was not possible.

EPR spectroscopy was also used to identify the oxidation state of the photodeposited copper. In addition to the purple species, samples of Cu(O)-$TiO_2$ and Cu(II)-$TiO_2$ were prepared from a solution containing 50 $\mu$g of Cu(II)/ml, 0.1 M sodium formate, and 6 g of $TiO_2$/l. The Cu(O)-$TiO_2$ species was prepared by adding sodium borohydride to this solution, which resulted in a bluish-gray deposit on the $TiO_2$ which was isolated by centrifugation. The Cu(II)-$TiO_2$ was prepared by evaporating the water from the solution, resulting in a light green solid. The purple Cu(I)-$TiO_2$ was prepared using photoreactor I. All three solid samples contained 8.4 mg of Cu/g of $TiO_2$.

The purple Cu-$TiO_2$ gave no EPR signal which is consistent with an electron configuration for Cu(I) of [Ar]$3d^{10}4s^0$. The Cu(II)-$TiO_2$ solid exhibited an intense EPR signal, which had the characteristic shape found for Cu(II) species. The spectrum for the Cu(O)-$TiO_2$ sample had a weak, but reproducible, signal near between 3000 and 3500 G. Since Cu(O) is [Ar]$3d^{10}4s^1$, it should be EPR active as an atomic species, but the spins would be highly coupled in a bulk solid.

The absence of EPR signal for the purple Cu-$TiO_2$ formed under photoelectrochemical conditions, while the Cu(O)-$TiO_2$ material prepared by using a strong reducing agent does not produce an EPR spectrum, supports the assignment of Cu(i) for the purple species. The fact that the copper deposited on the purple $TiO_2$ is readily oxidized to Cu(II) by oxygen is also consistent with known redox chemistry of Cu(I) coordination compounds (Cotton & Wilkinson (1980) *Advanced Inorganic Chemistry*, John Wiley & Sons, New York).

Example 2 describes generally the photoreductive deposition of Cu(Ii) ions on $TiO_2$. Example 3 describes volume reduction experiments in which Cu(II) ion present in waste solution was concentrated by a factor of 12.7. This experiment was not optimized, but was designed to establish the possibilities in volume reduction achievable using only light and air as energy sources. The experimental data presented in Table I show that in a system designed specifically for this process, values of 99.8% metal removal are possible. From the data presented in FIG. 5, one can predict the achievement of 100% removal efficiencies. The data in Table I also indicate that the same $TiO_2$ could be recycled indefinitely without loss of photocatalytic activity. To confirm this, the photoreductive deposition and oxidative recovery process was cycled 8 times using the same $TiO_2$ and copper/formate waste solution without deactivation of the photocatalyst. Example 4 describes the photooxidation of formate by $TiO_2$. Example 5 describes the effect of pH on the photodeposition of Cu(II) on $TiO_2$, while Example 6 describes the effect of the organic molecule present as the hole scavenger on the process of the present invention. Example 7 describes the effect of the anion present on Cu(II) photodeposition.

EXAMPLE 1

Experimental Procedures

Materials. The $TiO_2$ used was Degussa P-25 which was mostly anatase, had a Brunauer-Emmett-Teller (BET) surface area of 50 m$^2$/g and an average particle diameter of 30 nm. All other chemicals used were reagent grade.

Photoreactors. Two types of photoreactors were used. Photoreactor I consists of a sealed 150 ml Erlenmeyer flask illuminated from the side by two black lights. The reactor solution was stirred using a magnetic stir plate. This reactor was not purged with nitrogen and became oxygen starved after all the oxygen was photoreduced. Photoreactor II is an annular photoreactor (shown in FIG. 1) and described above.

The photon flux of the photoreactor was determined by potassium ferrioxalate chemical actinometry (Hatchard & Parker (1956) Proc. R. Soc. London Set. A. 235:518; Murov (1973) Handbook of Photochemistry, Marcel Dekker, Inc., New York; Bowman & Demas (1976) J. Phys. Chem. 80:2434). The photon flux was $1.67 \times 10^{18}$ photons (300–388 nm)s$^{-1}$ (2.9 mW/cm$^2$).

Sampling. In the copper photodeposition experiments (Example 2), all samples were taken from the reservoir while minimizing exposure to oxygen. The samples were immediately filtered using 0.2 $\mu$m nylon syringe filters and stored in plastic with a few drops of HCl to minimize adsorption of copper ions to the container. In the formate oxidation experiment (Example 4), samples were diluted with a saturated calcium carbonate solution to precipitate any carbon dioxide that may have formed that would have contributed to the total organic concentration (TOC). The samples were then filtered using 0.2 μm nylon syringe filters.

Analyses. Cooper concentrations were determined by atomic absorbance (AA) using a Perkin Elmer 360 Atomic Absorbance Spectrophotometer at 324.7 nm. TOCs were determined using an O.I. Analytical Total Organic Analyzer. The pH of the solutions were determined using an Orion Research Model 701A/Digital Ionalyzer.

X-ray photoelectron (XPS) spectra were recorded using a Leybold-Haraeus Series 10 ESCA module with a Mg Kα source at 13 keV and an emission current at 20 mA (power 260 W). The turbomolecular-pumped UHV chamber had a base pressure of $7 \times 10^{-5}$ Pa. The binding energies of the measured spectra were charge referenced using the C 1s binding energy of 284.6 eV.

Electron paramagnetic resonance (EPR) spectra were measured on a Bruker ESP 800 at 9.45 GHz. Microwave frequencies were measured with a Hewlett-Packard frequency counter. Under a nitrogen atmosphere, vacuum-dried samples were placed into 4-mm-diameter quartz EPR tubes.

EXAMPLE 2

Photoreductive Deposition

The overall photoreductive deposition process is as follows: A 2L waste stream sample was divided into 5 nitrogen-purged 500 ml portions. Each portion was placed in a magnetically stirred reservoir of photoreactor II (FIG. 1). Three grams of fresh $TiO_2$ were placed in the reactor with the first portion. The solution was continuously purged with nitrogen and illuminated for 10 minutes. The reactor was drained under a flow of nitrogen into the reservoir flask and the flask placed into a nitrogen-purged glove bag. An aliquot was taken, filtered and analyzed for Cu(II) ion concentration (Table I).

The purple Cu-$TiO_2$ was allowed to settle and as much of the supernatant as possible (approximately 350 ml) decanted through two pieces of filter paper. A small amount of purple $TiO_2$ was lost during decantation; most of this was collected on the filter paper. The remaining solution was centrifuged and the supernatant decanted.

To establish a concentrated solution for the first aliquot, 55 ml of 0.01 M $H_2SO_4$ solution was added to the purple $TiO_2$ and the solution was stirred and purged with compressed air to oxidize the Cu-$TiO_2$ species to Cu(II) (white $TiO_2$). The concentrate containing the white $TiO_2$ was centrifuged, and the concentrated supernatant used to concentrate the next four portions. The $TiO_2$ was recovered from the centrifuge tubes using the next waste aliquot. This procedure was repeated four more times each using 500 ml of the waste solution and reusing the $TiO_2$. After the fifth aliquot, the $TiO_2$ was washed with a 1% (volume/volume) nitric acid ($HNO_3$) solution and dried under vacuum.

EXAMPLE 3

Photodeposition and Volume Reduction Experiments

The $CuSO_4$/sodium formate/HCl system of Example 2 was used to a conduct a volume reduction experiment. The purpose was to concentrate 2.5 l of a 50.9 μg Cu/ml solution to approximately 200 ml, theoretically containing 636 μg Cu/ml. This experiment was performed by using the photodeposition/separation/oxidative recovery cycle shown in FIG. 3 whereby the copper ion present in 2.5 l of waste water is concentrated by photodeposition onto $TiO_2$ and resolubilization in a reduced volume of ~200 ml.

A 2500 ml waste solution containing 50.9 μg Cu/ml (as $CuSO_4$) and 0.1 M formate (pH 3.66) was processed in five 500 ml portions (designated Nos. 1-5), in accordance with the experimental procedure described in Example 2 and FIG. 4. The same $TiO_2$ was reused each time. The Cu(II)-concentration in the supernatant of each portion after photodeposition and before and after filtration is shown in Table I. The Cu(II) ion concentration before filtration represents a minimum removal percentage of Cu(II) ion from the waste stream. The Cu(II) ion concentrations after filtration are greater than or equal to the Cu(II) ion concentration before filtration due to some of the Cu-$TiO_2$ passing through the filter paper with the supernatant, The Cu-$TiO_2$ was oxidized to Cu(II), thus increasing the Cu(II) content of the supernatant. A total volume of 2417 ml of supernatant was collected.

The 2417 ml of collected supernatant contained 0.57 μg Cu/ml, corresponding to removal of 98.9% of the copper from the waste solution. During the process, 50 ml of water was used to retrieve any remaining $TiO_2$ from the reservoir flask; therefore, 133 ml (2550-2417 ml) were lost during transfer of the solution. The 170 ml (30 ml of the concentrate was lost during solution transfers) of concentrate contained 646 μg Cu(II)/ml, a 86.3% recovery of the copper removed from the waste solution. Overall, the volume of the waste stream was reduced by a factor of 14.7 (2500 ml to 170 ml), and Cu(II) concentrated by a factor of 12.7 (50.9 to 646 μg/ml).

As shown in Table II, over 90% of the original copper was accounted for in the various solutions, the remaining copper being lost through solution transfers. 64% (1.91 g) of the original 3.0 g of $TiO_2$ was recovered from the fifth portion. The other 36% was distributed in the supernatant, the reactor, and miscellaneous glassware.

EXAMPLE 4

Photooxidation of Formate

Figure 6:
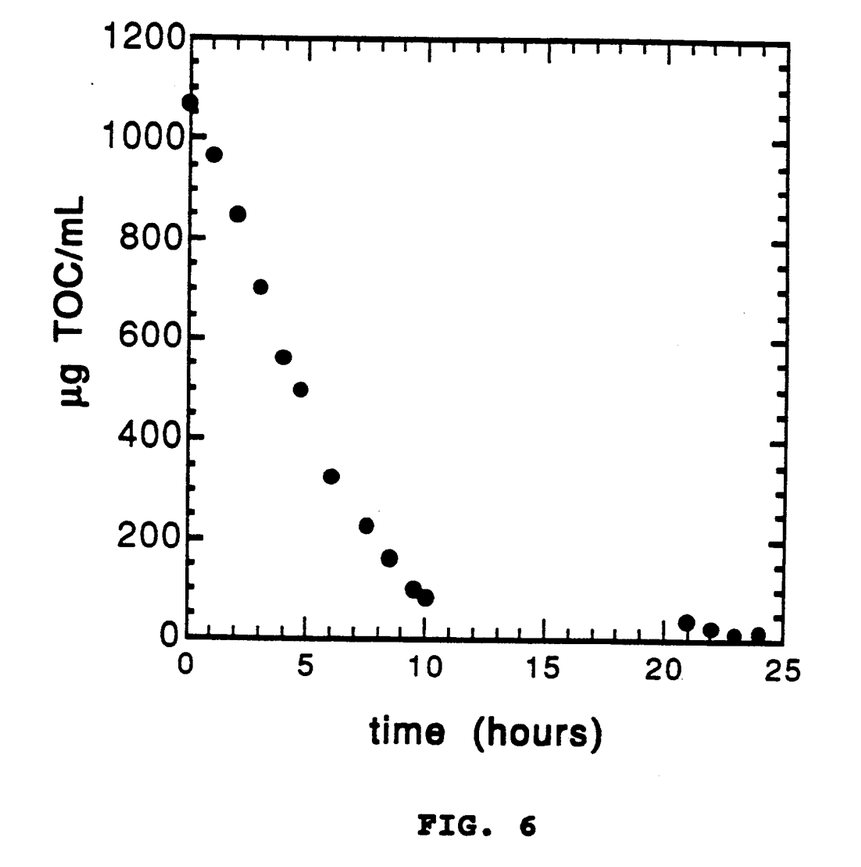
FIG. 6 shows the formate concentration (Bg TOC/ml) as a function of time for 400 ml of Supernatant No. 2 initially containing 1100 µg TOC/ml, 0.8 g TiO$_2$, and 0.54 µg Cu/ml.

After the removal and concentration of copper ions described in Example 3, the collected supernatants contained almost 1200 μg TOC/ml as formate. 400 ml of Supernatant 2 was placed into photoreactor II with 0.8 g of fresh $TiO_2$. The system was purged with $O_2$ and illuminated for 24 hours. FIG. 6 shows the decrease in formate concentration (μg TOC) as a function of time. The solution was reduced from 1066 μg TOC/ml to approximately 13 μg TOC/ml in 24 hours. The initial rate of formate destruction for the first 5 hours was 126 μg of TOC/ml-hr, corresponding to an overall photoefficiency of 86%. Photoeffiency is the rate of decrease in the TOC concentration divided by the photon flux determined by actinometry (x 100), and is based on a stoichiometry of two photons required for oxidation of each formate ion to $CO_2$ (shown in reactions 1-4). Backscattering of the light was not taken into account. The results obtained in photoreactor II are in agreement with those obtained in prior studies (Matthews (1988) supra; Bideau et al. (1990) supra; Brown, G. N. (1991) Ph.D. Thesis, *Photocatalysis and Photoelectrochemical*

Detection at Semiconducting Titanium Dioxide, University of Colorado, Boulder, Col.). This establishes that photoreactor II performed in a normal manner under typical photooxidation conditions and that the residual copper remaining in the supernatant did not inhibit the removal of organics by $TiO_2$ photocatalysis. In an actual waste treatment process, formate ion could be converted to $CO_2$ or neutralized and removed by vacuum evaporation.

EXAMPLE 5

Effect of pH on Copper Photodeposition

The effect of pH was studied quantitatively using photoreactor I. 130 mls of a 50 $\mu$g Cu/ml (as $CuSO_4$), 0.1 M sodium formate solution and 0.26 g of $TiO_2$ were used. The pH was adjusted with HCl or NaOH.

The effect of pH on copper photodeposition is summarized in Table III. At pH $\geq$ 1.84 less than 0.4% of the Cu(II) remained in the supernatant after illumination. However, the percentage of Cu(II) returned to the supernatant during air oxidation decreased with increasing pH.

At a pH between 1.35 and 4.52, $TiO_2$ turned either pink or purple during illumination. After air oxidation, $TiO_2$ turned white, and virtually all of the Cu(II) returned to the supernatant, as described in reactions 1-5. At a pH between 5.08 and 6.60, $TiO_2$ turned dark purple during illumination. After air oxidation, $TiO_2$ turned light green, and depending on the pH, between 1-72% of the Cu(II) returned to the supernatant. The decreased supernatant Cu(II) concentration after air oxidation seen with increasing pH may result from precipitation of basic copper carbonates (reaction 6) and/or basic copper sulfates (reactions 7 and 8):

malachite: $2Cu^{2+} + 2OH^- + CO_3^{2-} \longrightarrow Cu_2CO_3(OH)_2$ (green)    6 bronchantite: $4Cu^{2+} + 6OH^- + SO_4^{2-} \longrightarrow CuSO_4 \cdot 3Cu(OH)_2$ (green)    7 antlerite: $3Cu^{2+} + 4OH^- + SO_4^{2-} \longrightarrow CuSO_4 \cdot 2Cu(OH)_2$ (green)    8

However, if the pH of the solutions between 5.08 and 6.6 was lowered to pH 3.6 after photodeposition, at least 90% of the Cu(II) returned to the supernatant. Lowering the pH prevents formation of basic copper sulfates and carbonates. During photodeposition, Cu(II) may be photoreduced to a mixture of Cu(I) and Cu(O). Possibly Cu(O) is stable in air and only Cu(I) is oxidized by $O_2$. This would result in a decreased Cu(II) concentration in the supernatant, even if the solution is acidified.

When pH is 0.64, $TiO_2$ remained white, and 95% of the Cu(II) remained in the supernatant after illumination. At such a low pH, photons are reduced to dihydrogen (reaction 9) and water oxidized to dioxygen (reaction 10):

$4(TiO_2) + h\mu \rightarrow 4e^- + 4h^+$    9

$4H^+ + 4e^- \rightarrow 2H_2$    10

$2H_2O + 4h^+ \rightarrow 4H^+ + O_2$    11 net: $2H_2O + 4h\mu \rightarrow 2H_2 + O_2$    12

EXAMPLE 6

Effect of Organic Molecule on Copper Photodeposition

The effect of different organic molecules used as hole scavengers was studied quantitatively using photoreactor I. 130 mls of a 50 $\mu$g Cu/ml (as $CuSO_4$) and 0.1 M organic solution (pH 3.5-3.6), and 0.26 g of $TiO_2$ was used.

Table IV summarizes the effects of each organic scavenger on copper photodeposition. After photoreduction, more than 87% of the Cu(II) ion remained in the supernatant of $TiO_2/CuSO_4$ solutions containing no organic, sodium acetate, sodium proprionate, acetone, ethanol, or t-butanol. In solutions containing sodium formate or sodium oxalate, only 1% of the Cu(II) ion remained in the supernatant after photoreduction; after air oxidation, nearly all of the Cu(II) ion was returned to the supernatant. In solutions containing EDTA or citric acid, only 1% of the Cu(II) ion remained in the supernatant after photoreduction; however, only 8% and 55% of the Cu(II) ion was returned to the supernatant during oxidation, respectively. Photoreduction of solutions containing methanol or isopropanol retained 40% and 54% of the Cu(II) ion in the supernatant, respectively, while at least 99% of the Cu(II) ion returned to the supernatant during oxidation.

When the concentration of ethanol, methanol, or isopropanol was increased to 20% (v/v), copper photodeposition was significantly increased and only 1% of the Cu(II) ion remained in the supernatant after photoreduction. After oxidation, 100% of the Cu(II) ion returned to the supernatant. When acetone or t-butanol concentrations were increased to 20% (v/v), no copper photodeposition was observed and 100% of the Cu(II) ion remained in the supernatant.

Prairie et al. (1992) Proceedings of the ASME International Solar Energy Conference, pp. 1-8, measured the oxidation rates for carbon tetrachloride, chloroform, methylene chloride, 1,1,2-trichloroethane, tetrachloroethylene, and trichloroethylene in aqueous $TiO_2$ solutions containing no metals under aerobic conditions. They reported a positive correlation between the measured oxidation rates versus the published literature rate constants for reactions with hydroxyl radicals in aqueous solutions ranging from $7.7 \times 10^6$ to $3.2 \times 10^9$ $M^{-1}g^{-1}$ (Huxton et al. (1988) J. Phys. Chem. Ref. Data 17:513). No correlation exists between these rate constants and whether copper was photodeposited or not.

EXAMPLE 7

Effect of Anion Molecule on Cu (II) Photodeposition

The effect of anions on the photodeposition process was studied quantitatively in photoreactor I using sodium formate (pH 3.5-3.6). The anions tested were $Cl^-$, $NO_3^-$, $ClO_4^-$, and $SO_4^{2-}$. Conditions were as described in Example 5. $TiO_2$ turned purple during illumination, and the Cu (II) ion concentration in the supernatant was less than 0.6%. During air oxidation, $TiO_2$ turned white, and at least 98% of the Cu(II) ion returned to the supernatant for each of the anions tested.

EXAMPLE 8

Photooxidation of Organics Followed by Photoreductive Deposition of Metal Ion In one embodiment of the method of the present invention, contaminant organics are photooxidized first, followed by removal of metal ions by photoreductive deposition in the presence or absence of added organic molecules.

The steps taken to photocatalytically treat a waste containing both organics and metals depend on which organics and metals are present and their concentrations. Some metals will photodeposit in the presence of certain organics while other metals will not.

If the organic is in excess and the metal will photodeposit under those solutions, then the metal may be removed photocatalytically under anaerobic conditions. After the metal-$TiO_2$ is removed, the remaining organics are photocatalytically oxidized.

If the metal is in excess or will not photodeposit due to the solution conditions, the waste may be treated in a three step process. First the organic is photocatalytically oxidized under aerobic conditions without metal photodeposition. After all of the organic is oxidized, the metal is photodeposited under anaerobic conditions with the addition of excess organic. After removal of $TiO_2$, the remaining organic is photocatalytically oxidized under aerobic conditions.

TABLE I

PERCENT REMOVAL OF CU(II) FROM SUPERNATANT IN VOLUME REDUCTION PROCESS.

| 500 ml Portion No. | Cu(II) before filtration (μg/ml) | % Removal | Cu(II) after filtration (μg/ml) | % Removal | Supernatant Collected (ml) |
|---|---|---|---|---|---|
| 1 | 0.28 | 99.5 | 0.56 | 98.9 | 480 |
| 2 | 0.10 | 99.8 | 0.54 | 98.9 | 486 |
| 3 | 0.40 | 99.2 | 0.60 | 98.8 | 486 |
| 4 | 0.27 | 99.5 | 0.47 | 99.1 | 484 |
| 5 | 0.68 | 99.7 | 0.68 | 99.7 | 481 |

TABLE II

FINAL DISTRIBUTION OF CU(II) IN SUPERNATANT IN THE VOLUME REDUCTION PROCESS.

| SOLUTION | ml | Cu(II) (μg/ml) | % of Total Cu |
|---|---|---|---|
| Concentrate | 170 | 646.00 | 86.3 |
| Combined Supernatants | 2417 | 0.57 | 1.1 |
| Filter Wash | 500 | 1.1 | 0.4 |
| $TiO_2$ Wash | 100 | 38.7 | 2.6 |
| Reactor Wash | 100 | 6.4 | 0.5 |
| TOTAL Cu | | | 90.9 |

TABLE III

THE EFFECT pH ON CU(II) PHOTODEPOSITION.

| | Illumination, $N_2$ purge | | No Illumination, Air Oxidation | |
|---|---|---|---|---|
| pH | % Initial Cu(II) | $TiO_2$ Color | % Initial Cu(II) | $TiO_2$ Color |
| 0.64 | 95.0 | white | 100 | white |
| 1.35 | 76.0 | pink | 99 | white |
| 1.84 | 0.4 | pink | 100 | white |
| 2.54 | 0.3 | purple | 100 | white |
| 3.04 | 0.0 | purple | 100 | white |
| 3.53 | 0.3 | purple | 100 | white |
| 4.04 | 0.1 | purple | 100 | white |
| 4.52 | 0.2 | purple | 100 | white |
| 5.08 | 0.1 | dark purple | 72 | light green |
| 5.48 | 0.1 | dark purple | 1 | light green |
| 5.98 | 0.2 | dark purple | 1 | light green |
| 6.60 | 0.0 | dark purple | 1 | light green |

TABLE IV

THE EFFECT OF ORGANIC HOLE SCAVENGER ON CU(II) PHOTODEPOSITION.

| | Illumination, $N_2$ Purge | | No Illumination, Air Oxidation | |
|---|---|---|---|---|
| Organic Molecule | % Initial Cu(II) | $TiO_2$ Color | % Initial Cu(II) | $TiO_2$ Color |
| water | 98 | white | 99 | white |
| Na Acetate | 99 | white | 100 | white |
| Na propionate | 98 | white | 99 | white |
| ethanol | 97 | off-white | 100 | white |
| ethanol (3.9 M) | 1 | purple | 100 | white |
| t-butanol | 96 | white | 96 | white |
| t-butanol (1.9 M) | 100 | white | 100 | white |
| acetone | 87 | white | 93 | white |
| acetone (3.1 M) | 100 | white | 100 | white |
| Na oxalate | 1 | pink | 87 | white |
| Na formate | 1 | purple | 100 | white |
| citric acid | 1 | gray-purple | 55 | pale pink |
| EDTA | 1 | purple | 8 | purple |
| methanol | 40 | dark purple | 100 | white |
| methanol (5.7 M) | 1 | dark purple | 100 | white |
| isopropanol | 54 | purple | 99 | white |
| isopropanol (3.0 M) | 1 | purple | 100 | white |

We claim:

1. A photocatalytic method for removing metal contaminants from an aqueous phase comprising:
   a) contacting a first solution containing metal contaminants with a semiconductor photocatalyst;
   b) illuminating said first solution whereby said metal is photodeposited onto said photocatalyst forming a metal-photocatalyst complex;
   c) separating said metal-photocatalyst complex from said first solution;
   d) contacting said metal-photocatalyst complex with a second solution whereby said metal is resolubilized;
   e) separating said resolubilized metal and photocatalyst, and
   f) reusing said separated photocatalyst in step a.

2. The method of claim 1 wherein said aqueous phase contains organic contaminants, 3. The method of claim 2 further comprising:
   f) illuminating said first solution under conditions whereby the organic contaminants are photooxidized, 4. The method of claim 3 wherein said organic contaminants are oxidized before said metal is separated from said photocatalyst, 5. The method of claim 3 wherein said organic contaminants are oxidized before and after said metal is separated from said photocatalyst, 6. The photocatalyst of claim 1 wherein said semiconductor is titanium oxide ($TiO_2$).

7. The method of claim 1 wherein said second solution is an aqueous mineral acid.

8. The method of claim 1 wherein said first solution includes reductants.

9. The method of claim 8 wherein said reductant is sodium formate.

10. The method of claim 1 wherein said first solution includes oxidants.

11. The method of claim 10 wherein said oxidant is oxygen and said photocatalyst is titanium oxide ($TiO_2$).

* * * * *